United States Patent
Zheng et al.

(10) Patent No.: US 9,291,067 B2
(45) Date of Patent: Mar. 22, 2016

(54) ROTARY MACHINE ASPIRATING SEAL ASSEMBLY AND METHOD OF ASSEMBLING THE SAME

(71) Applicant: General Electric Company, Schenectady, NY (US)

(72) Inventors: Xiaoqing Zheng, Niskayuna, NY (US); Norman Arnold Turnquist, Sloansville, NY (US); Michael Dennis Mack, Ballston Spa, NY (US); Rahul Anil Bidkar, Niskayuna, NY (US); Azam Mihir Thatte, Arlington, MA (US)

(73) Assignee: General Electric Company, Schenectady, NY (US)

( * ) Notice: Subject to any disclaimer, the term of this patent is extended or adjusted under 35 U.S.C. 154(b) by 200 days.

(21) Appl. No.: 14/076,982

(22) Filed: Nov. 11, 2013

(65) Prior Publication Data

US 2015/0130138 A1 May 14, 2015

(51) Int. Cl.
*F01D 11/00* (2006.01)
*F01D 11/02* (2006.01)
*F16J 15/34* (2006.01)
*F16J 15/44* (2006.01)
*F16J 15/00* (2006.01)
*F16J 15/447* (2006.01)

(52) U.S. Cl.
CPC .............. *F01D 11/003* (2013.01); *F01D 11/02* (2013.01); *F16J 15/3404* (2013.01); *F16J 15/3412* (2013.01); *F16J 15/4472* (2013.01); *F16J 15/002* (2013.01)

(58) Field of Classification Search
CPC ..... F01D 11/02; F01D 11/025; F01D 11/003; F16J 15/002; F16J 15/164; F16J 15/342; F16J 15/3448; F16J 15/3452; F16J 15/346; F16J 15/4472; F16J 15/3404; F16J 15/3412
See application file for complete search history.

(56) References Cited

U.S. PATENT DOCUMENTS

| | | | | |
|---|---|---|---|---|
| 3,383,033 | A * | 5/1968 | Moore | 415/113 |
| 5,284,347 | A * | 2/1994 | Pope | 277/305 |
| 5,975,537 | A | 11/1999 | Turnquist et al. | |
| 6,145,840 | A * | 11/2000 | Pope | 277/348 |
| 6,676,369 | B2 | 1/2004 | Brauer et al. | |
| 6,758,477 | B2 | 7/2004 | Brauer et al. | |
| 7,044,470 | B2 | 5/2006 | Zheng | |
| 7,261,300 | B2 | 8/2007 | Agrawal et al. | |
| 7,654,535 | B2 | 2/2010 | Cross et al. | |
| 8,105,021 | B2 * | 1/2012 | Glahn et al. | 415/168.2 |
| 2003/0184022 | A1 | 10/2003 | Brauer et al. | |
| 2003/0185669 | A1 | 10/2003 | Brauer et al. | |
| 2004/0007823 | A1 * | 1/2004 | Brauer et al. | 277/421 |

(Continued)

*Primary Examiner* — Kristina Fulton
*Assistant Examiner* — Nicholas L Foster
(74) *Attorney, Agent, or Firm* — Armstrong Teasdale LLP

(57) ABSTRACT

An aspirating face seal for use with a rotary machine includes a rotating seal ring including a radially outer surface that includes an oblique portion. A stationary seal ring is coupled proximate the rotating seal ring such that a first gap is defined therebetween. The stationary seal ring is movable along a centerline axis of the rotary machine between an open position and a sealed position, and includes an extension member that extends across the first gap. An auxiliary seal includes at least one seal tooth that includes a seal tooth tip. The at least one seal tooth extends radially inward from the extension member such that a second gap is defined between the seal tooth tip and the oblique portion.

20 Claims, 5 Drawing Sheets

(56) References Cited

U.S. PATENT DOCUMENTS

| | | |
|---|---|---|
| 2006/0171617 A1 | 8/2006 | Cross et al. |
| 2006/0239816 A1* | 10/2006 | Labbe et al. ............... 415/230 |
| 2007/0007730 A1* | 1/2007 | Garrison et al. ............ 277/411 |
| 2008/0018054 A1* | 1/2008 | Herron et al. ............... 277/409 |
| 2010/0201074 A1* | 8/2010 | Haynes et al. ............... 277/361 |
| 2011/0229311 A1* | 9/2011 | Varanasi et al. ........... 415/170.1 |
| 2012/0251290 A1* | 10/2012 | Turnquist et al. ................ 415/1 |
| 2013/0241153 A1* | 9/2013 | Garrison ..................... 277/350 |

* cited by examiner

US 9,291,067 B2

ROTARY MACHINE ASPIRATING SEAL ASSEMBLY AND METHOD OF ASSEMBLING THE SAME

BACKGROUND

This application relates generally to rotary machines and more particularly, to an aspirating seal assembly for sealing a rotary machine.

At least some rotary machines, such as steam turbine engines, have a defined fluid flow path extending therethrough. The flow path includes, in a serial-flow relationship, a fluid inlet, a turbine, and a fluid outlet. A leakage flow path exists in some known rotary machines upstream of the primary flow path between an area of high pressure and an area of low pressure. Some rotary machines use a plurality of sealing assemblies in the leakage flow path to facilitate increasing the operating efficiency of the rotary machine. Generally, known seal assemblies are coupled between a stationary component and a rotary component to provide sealing between the high-pressure area and the low-pressure area.

In some known rotary machines, hydrodynamic face seals may be used to facilitate reducing leakage of a pressurized process fluid through a gap between the stationary component and the rotary component. Hydrodynamic face seals generally include a rotating ring and a stationary (non-rotating) ring. At the startup of at least some known rotary machines containing hydrodynamic face seals, the rotating ring and the stationary ring are biased away from each other until pressure builds up within the machine and moves the stationary ring toward the rotating ring. During operation, hydrodynamic grooves formed in the rotating ring generate a hydrodynamic force that causes the stationary ring to remain separated from the rotating ring such that a small gap exists between the two rings. However, if the high pressure acting on the stationary ring is too forceful, the hydrodynamic force created by the grooves may not be enough to keep the stationary ring from impacting the rotating ring and causing serious damage to the rotary machine.

BRIEF DESCRIPTION

In one aspect, an aspirating face seal for use with a rotary machine that includes a centerline axis is provided. The aspirating face seal includes a rotating seal ring including a radially outer surface that includes an oblique portion. A stationary seal ring is coupled proximate the rotating seal ring such that a first gap is defined therebetween. The stationary seal ring is movable along the centerline axis between an open position and a sealed position, and includes an extension member that extends across the first gap. An auxiliary seal includes at least one seal tooth that includes a seal tooth tip. The at least one seal tooth extends radially inward from the extension member such that a second gap is defined between the seal tooth tip and the oblique portion.

In another aspect, a rotary machine is provided. The rotary machine includes a casing and a rotatable shaft defining a centerline axis. The rotary machine also includes a sealing system including a rotating seal ring coupled to the shaft, wherein the rotating seal ring includes a radially outer surface that includes an oblique portion. The sealing system also includes a stationary seal ring coupled to the casing proximate the rotating seal ring such that a first gap is defined therebetween. The stationary seal ring is movable along the centerline axis between an open position and a sealed position, and the stationary seal ring includes an extension member that extends across the first gap. The sealing system also includes an auxiliary seal including at least one seal tooth that includes a seal tooth tip. The at least one seal tooth extends radially inward from the extension member such that a second gap is defined between the seal tooth tip and the oblique portion.

In yet another aspect, a method of assembling a sealing system for use in a rotary machine is provided. The method includes coupling a rotating seal ring to a rotatable shaft that defines a centerline axis and coupling a stationary seal ring proximate the rotating seal ring such that a first gap is defined therebetween. The stationary seal ring is movable along the centerline axis between an open position and a sealed position. The stationary seal ring includes an extension member that extends across the first gap. The method also includes forming an auxiliary seal radially outward from the rotating seal ring. The auxiliary seal includes at least one seal tooth that includes a seal tooth tip. The at least one seal tooth extends radially inward from the extension member such that a second gap is defined between the seal tooth tip and the oblique portion.

DETAILED DESCRIPTION

The exemplary apparatus and systems described herein overcome at least some of the disadvantages associated with rotary machines that may operate with fluid leakage from the rotary machine to the external environment. The embodiments described herein provide an aspirating face seal assembly positioned between a stationary (non-rotating) component and a rotary component of the rotary machine that facilitates improving rotary machine performance. More specifically, the aspirating face seal assembly described herein includes an auxiliary seal that substantially reduces fluid leakage between an area of low pressure and an area of high pressure within the rotary machine. The auxiliary seal includes a seal tooth on the stationary component that travels axially along an obliquely-oriented surface on the rotary component to cause a pressure drop that prevents the stationary component from impacting the rotating component during steam turbine engine operation.

Figure 1:
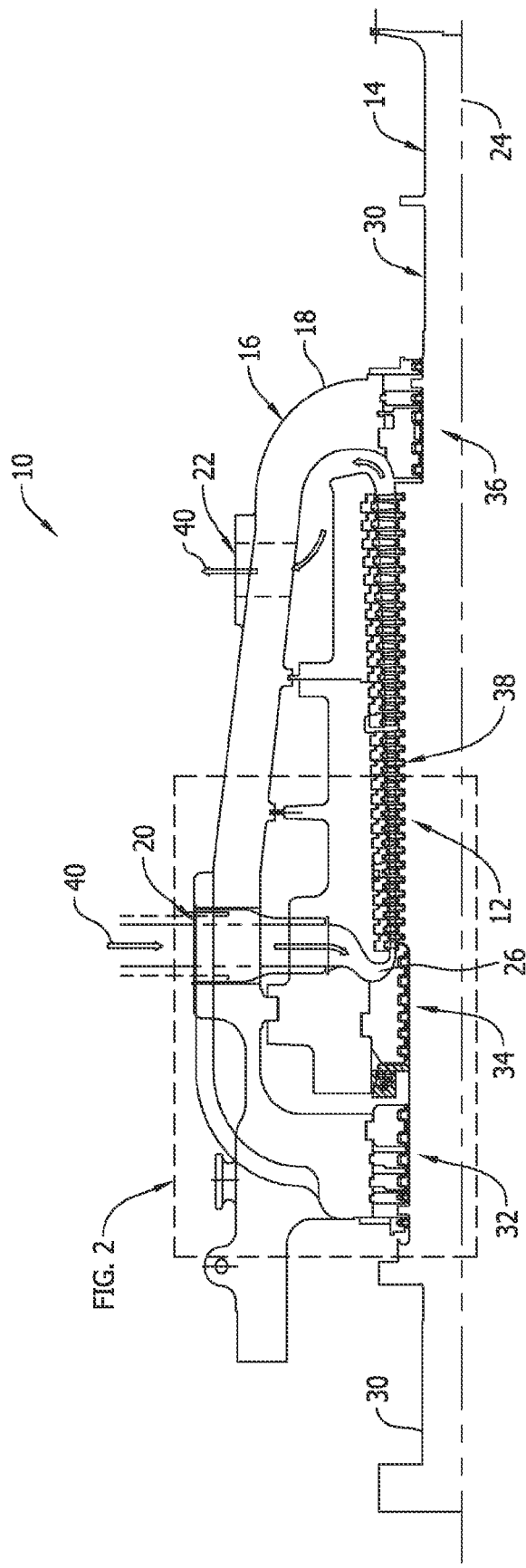
FIG. 1 is a schematic view of an exemplary steam turbine engine.

FIG. 1 is a schematic view of an exemplary steam turbine engine 10. While FIG. 1 describes an exemplary steam turbine engine, it should be noted that the sealing apparatus and systems described herein is not limited to any one particular type of turbine engine. One of ordinary skill in the art will appreciate that the current sealing apparatus and systems described herein may be used with any rotary machine, including a gas turbine engine, in any suitable configuration that enables such an apparatus and system to operate as further described herein.

In the exemplary embodiment, steam turbine engine 10 is a single-flow steam turbine engine. Alternatively, steam turbine engine 10 may be any type of steam turbine, such as, without limitation, a low-pressure turbine, an opposed-flow, high-pressure and intermediate-pressure steam turbine combination, a double-flow steam turbine engine, and/or the like. Moreover, as discussed above, the present invention is not limited to only being used in steam turbine engines and can be used in other turbine systems, such as gas turbine engines.

In the exemplary embodiment, steam turbine engine 10 includes a plurality of turbine stages 12 that are coupled to a rotatable shaft 14. A casing 16 is divided horizontally into an upper half section 18 and a lower half section (not shown). Steam turbine engine 10 includes a high pressure (HP) steam inlet conduit 20 and a low pressure (LP) steam exhaust conduit 22. Shaft 14 extends through casing 16 along a centerline axis 24. Shaft 14 is supported at opposite end portions 30 of shaft 14 by journal bearings (not shown). A plurality of end packing regions or sealing members 32, 34, and 36 are coupled between rotatable shaft end portions 30 and casing 16 to facilitate sealing casing 16 about shaft 14.

During operation, high pressure and high temperature steam 40 is channeled to turbine stages 12 from a steam source, such as a boiler or the like (not shown), wherein thermal energy is converted to mechanical rotational energy by turbine stages 12. More specifically, steam 40 is channeled through casing 16 via steam inlet conduit 20 into an inlet bowl 26 where it impacts a plurality of turbine blades or buckets 38 coupled to shaft 14 to induce rotation of shaft 14 about centerline axis 24. Steam 40 exits casing 16 at steam exhaust conduit 22. Steam 40 may then be channeled to the boiler (not shown) where it may be reheated or channeled to other components of the system, e.g., a low pressure turbine section or a condenser (not shown).

Figure 2:
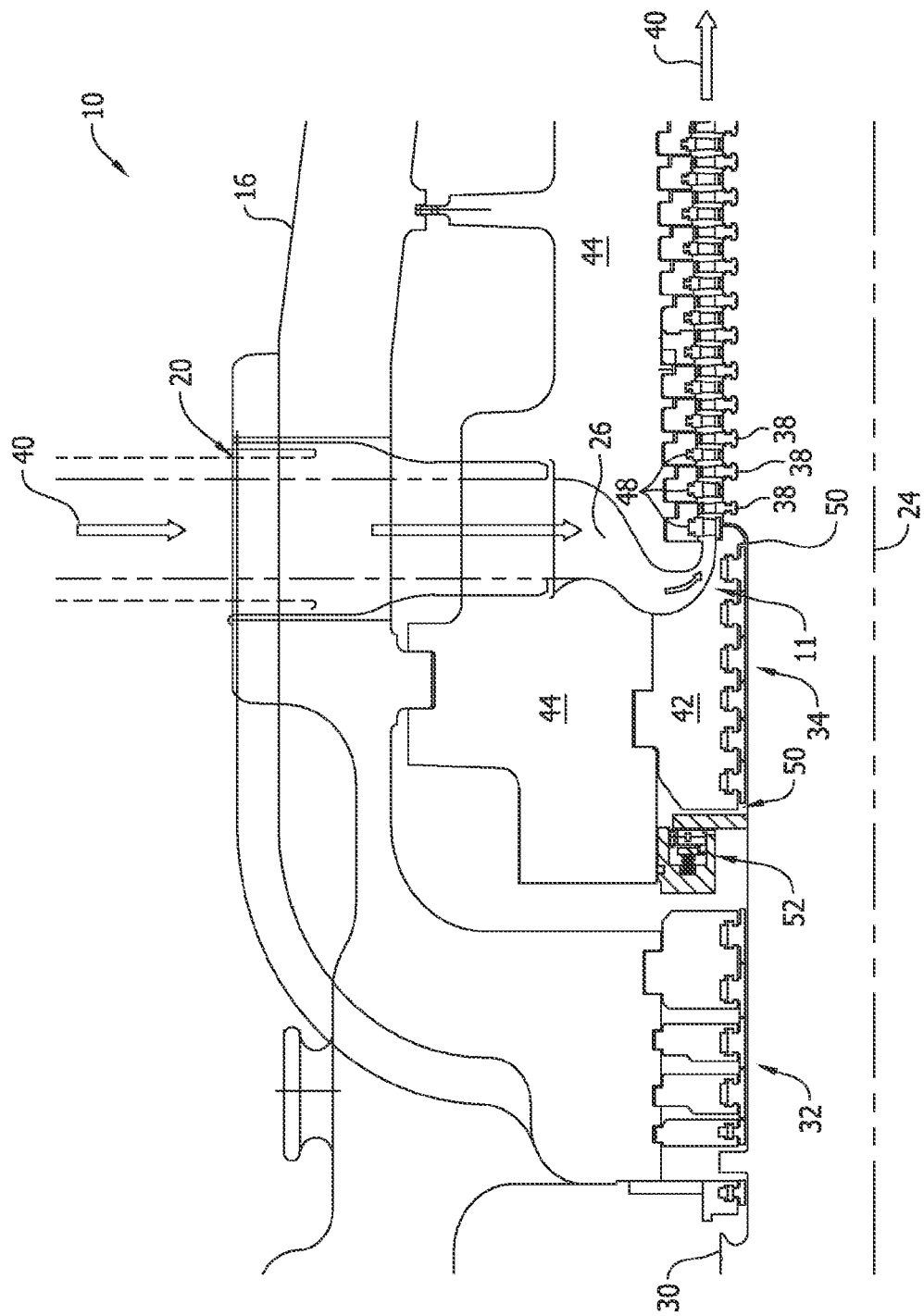
FIG. 2 is a more detailed schematic view of a portion of the steam turbine engine taken about an area defined in FIG. 1.

FIG. 2 is a more detailed schematic view of a portion of steam turbine engine 10 taken about area 2 defined in FIG. 1. In the exemplary embodiment shown in FIG. 2, steam turbine engine 10 includes shaft 14, a stator component 42 coupled to an inner shell 44 of casing 16, and a plurality of sealing members 34 attached to stator component 42. Casing 16, inner shell 44, and stator component 42 each extend circumferentially about shaft 14 and sealing members 34. In the exemplary embodiment, sealing members 34 form a tortuous sealing path between stator component 42 and shaft 14. Shaft 14 includes a plurality of turbine stages 12 through which high-pressure high-temperature steam 40 is passed via one or more inlet bowls 26 at an inlet side 11 of steam turbine engine 10. The turbine stages 12 include a plurality of inlet nozzles 48. Steam turbine engine 10 may include any number of inlet nozzles 48 that enables steam turbine engine 10 to operate as described herein. For example, steam turbine engine 10 may include more or fewer inlet nozzles 48 than shown in FIG. 2. The turbine stages 12 also include a plurality of turbine blades or buckets 38. Steam turbine engine 10 may include any number of buckets 38 that enables steam turbine engine 10 to operate as described herein. For example, steam turbine engine 10 may include more or fewer buckets 38 than are illustrated in FIG. 2. Steam 40 enters inlet bowl 26 through steam inlet conduit 20 and passes down the length of shaft 14 through turbine stages 12.

A portion of the admitted high-pressure high-temperature steam 40 passes through the end packing sealing members 34 via a leakage region 50. The loss of steam 40 through leakage region 50 results in a loss of efficiency of steam turbine engine 10. As described above, to reduce the leakage of steam 40 through the end packing region 32, in the exemplary embodiment, steam turbine engine 10 includes a unique aspirating face seal assembly, generally indicated at 52.

Figure 3:
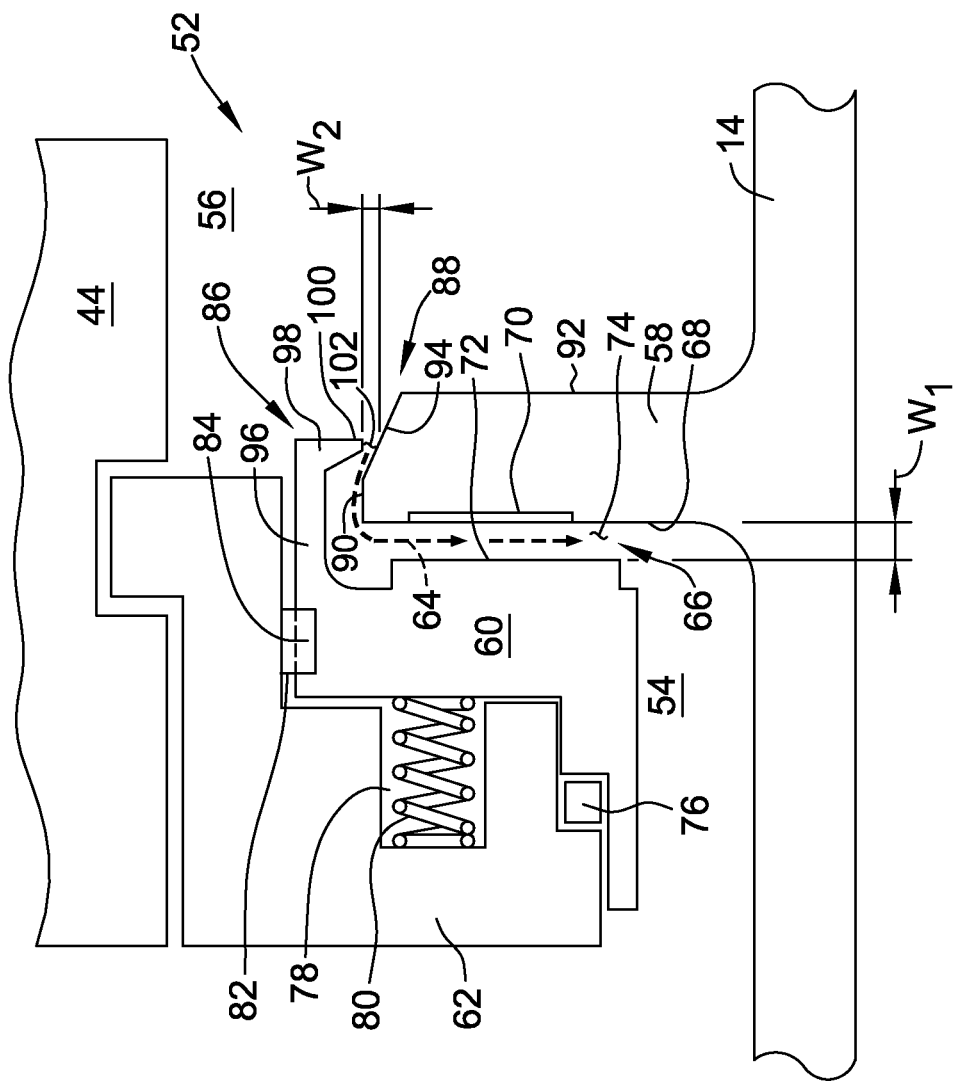
FIG. 3 is a schematic section view of an exemplary aspirating face seal assembly in an open position.
Figure 4:
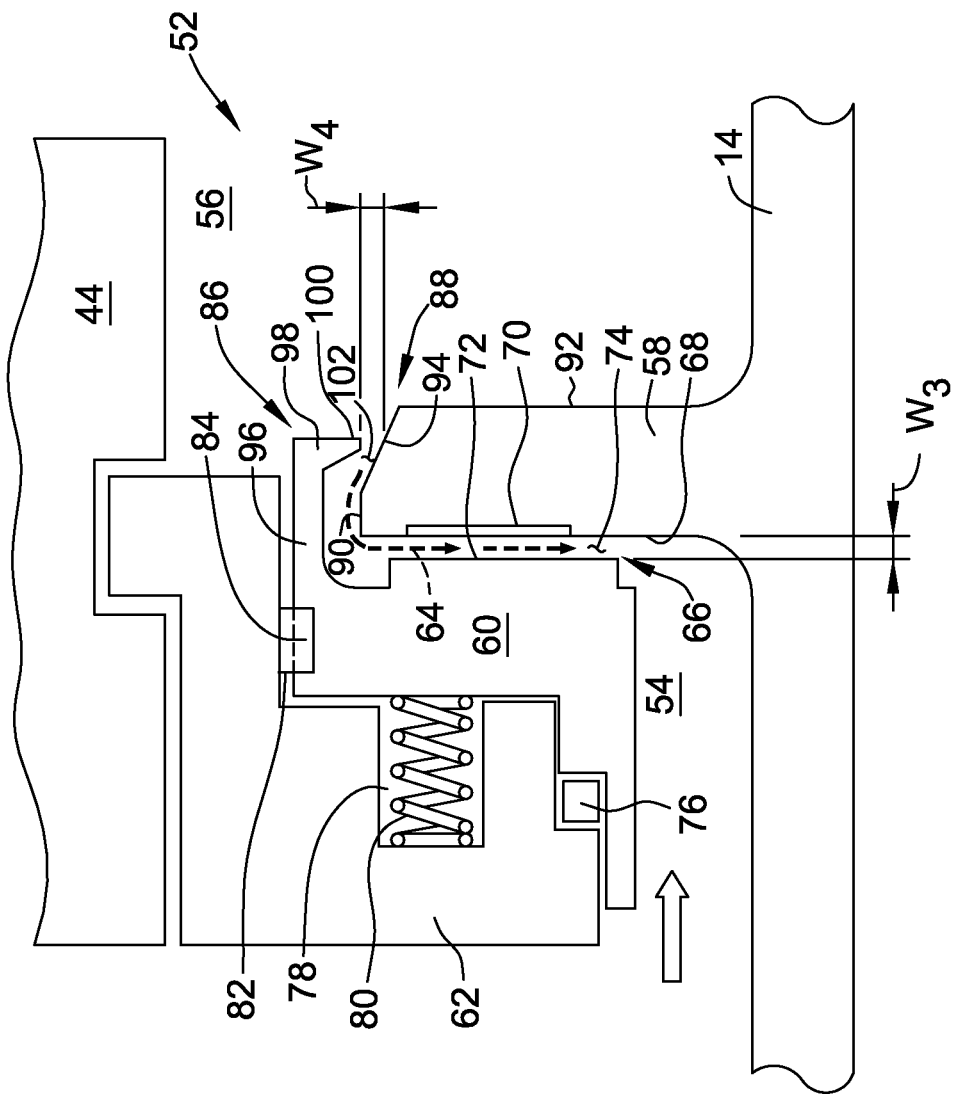
FIG. 4 is a schematic section view of the aspirating face seal assembly shown in FIG. 3 in an intermediate position.
Figure 5:
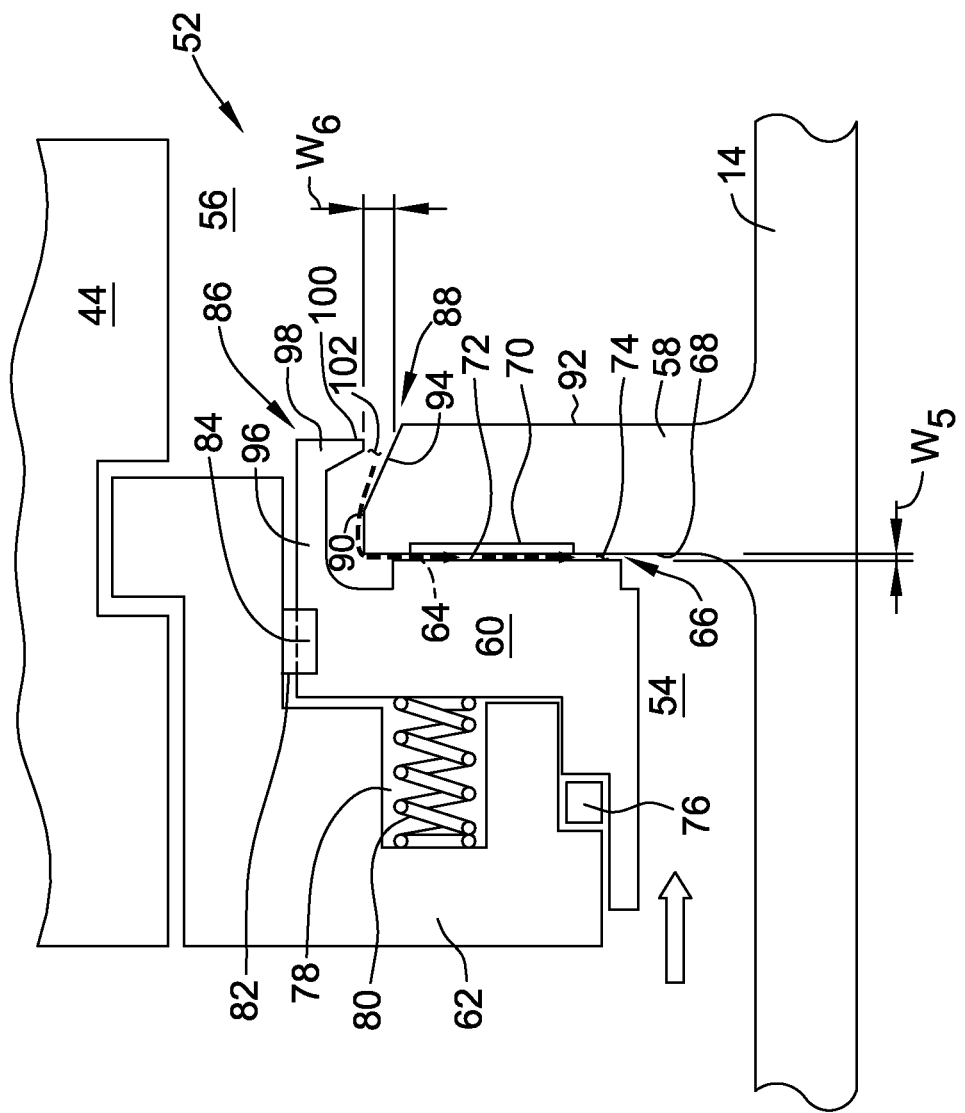
FIG. 5 is a schematic section view of the aspirating face seal assembly shown in FIG. 3 in a sealed position.

FIG. 3 is a schematic section view of aspirating face seal assembly 52 that may be used with steam turbine engine 10 (shown in FIG. 1). FIG. 3 shows face seal assembly 52 in an open position at a no pressure or a low pressure loading condition of engine 10. FIG. 4 is a schematic section view of aspirating face seal assembly 52 shown in an intermediate position when engine 10 is operating at a higher pressure loading than shown in FIG. 3. FIG. 5 is a schematic section view of aspirating face seal assembly 52 in a sealed position when engine 10 is operating at least at base load in a higher pressure loading condition than shown in FIG. 4. In the exemplary embodiment, face seal assembly 52 facilitates reducing or preventing leakage of a pressurized process fluid, e.g., steam 40, between a region of relatively low pressure 54 and an area of relatively high pressure 56. In the exemplary embodiment, face seal assembly 52 is a high pressure seal positioned between shaft 14 and inner shell 44 of casing 16 on an inlet side 11 of turbine stages 12. As described above, although a steam turbine engine 10 is illustrated, face seal assembly 52 may be used in any application where a self-adjusting seal is desirable or required. In the exemplary embodiment, face seal assembly 52 includes a rotating seal ring 58, a stationary seal ring 60, and a seal housing 62 concentric with and extending about centerline axis 24 of shaft 14. Rotating seal ring 58 and stationary seal ring 60 together form circuitous or tortuous leakage flow path 64 for steam 40 and also a primary seal 66 to seal path 64.

In the exemplary embodiment, rotating seal ring 58 is coupled to shaft 14 and is rotatable therewith. Alternatively, rotating seal ring 58 may be formed as an integral part of shaft 14. In the exemplary embodiment, rotating seal ring 58 is generally disk shaped and includes an axially-facing, rotating sealing surface 68 that includes hydrodynamic features such as channels or grooves 70 defined therein. During engine 10 operation, grooves 70 direct process fluid, e.g., steam 40, between rotating seal ring 58 and stationary seal ring 60, thus forming a process fluid film layer that is generally about 0.002 inches thick or less. Alternatively or additionally, grooves 70 may be formed in a stationary sealing surface 72 of stationary seal ring 60. Stationary sealing surface 72 is positioned proximate rotating sealing surface 68 of rotating seal ring 58 such that an axially-oriented gap 74 is defined between surfaces 68 and 72.

In the exemplary embodiment, seal housing 62 is configured to couple stationary seal ring 60 to inner shell 44 of casing 16. In some embodiments, seal housing 62 may be integrated with inner shell 44 of casing 16. Furthermore, in some alternative embodiments, stationary seal ring 60 may be coupled directly to inner shell 44. Seal housing 62 is a non-rotating, axially-extending component that includes a radial secondary seal 76 that enables stationary seal ring 60 to slide axially to follow rotating seal ring 58 dynamically in axial translation while providing sealing. Seal housing 62 also includes one or more spring seats 78 that are configured to receive a biasing component 80, such as a spring, therein. Biasing component 80 extends between spring seat 78 and stationary seal ring 60 and is configured to bias stationary seal ring 60 away from rotating seal ring 58 at no pressure or low pressure loading conditions to enable rotatable shaft 14 to rotate without initial contact between surfaces 68 and 72. Seal housing 62 may include a radially-inward extending alignment member 82 that is coupled to an alignment slot 84 formed on an outer edge of stationary seal ring 60. Stationary seal ring 60 is coupled to seal housing 62 such that stationary seal ring 60 is axially movable along centerline axis 24 and is not laterally or rotatably moveable. The tongue-in-slot coupling operates as an anti-rotation feature to prevent secondary seal ring 60 from rotating with rotating seal ring 58.

In the exemplary embodiment, aspirating face seal assembly 52 includes an auxiliary seal 86 located proximate a radially outer end 88 of rotating seal ring 58. Auxiliary seal 86 is configured to restrict airflow through leakage path 64 and to create sufficient pressure, when engine 10 is operating, to urge stationary seal ring 60 along axis 24 (shown in FIGS. 1 and 2) towards rotating seal ring 58, and, more specifically, toward rotating sealing surface 68. Radially outer end 88 includes a radially outer surface 90 that extends axially between rotating seal surface 68 and an opposing upstream surface 92 of rotating seal ring 58. Radially outer surface 90 includes an oblique portion 94 that is obliquely-oriented with respect to rotating seal surface 68, that is, at least a portion of radially outer surface 90 is not parallel to centerline axis 24. In the exemplary embodiment, oblique portion 94 is substantially planar such that it slopes radially inward from radially outer end 88 toward rotor 14 such that a length of upstream surface 92 is shorter than a length of rotating seal surface 68. Alternatively, oblique portion 94 may be substantially arcuate rather than planar. In the exemplary embodiment, oblique portion 94 extends only a partial distance between rotating sealing surface 68 and upstream surface 92. Alternatively, oblique portion 94 may extend a full distance between surfaces 68 and 92. Generally, oblique portion 94 extends any distance between surfaces 68 and 92 that facilitates auxiliary seal 86 operation as described herein.

In the exemplary embodiment, auxiliary seal 86 is also formed by an extension member 96 that extends axially across leakage path 64 from stationary seal ring 60. A distal end of extension member 96 includes at least one auxiliary seal tooth 98 such that seal tooth 98 is located radially outward from radially outer end 88 of rotating seal ring 58. Seal tooth 98 extends radially inward toward radially outer end 88 and terminates at a tooth tip 100. In the exemplary embodiment, tooth tip 100 is located radially outward from oblique portion 94 such that a radially-oriented gap 102 is defined between tooth tip 100 and oblique portion 94 of radially outer surface 90.

During operation of engine 10, aspirating face seal 52 is configured to be axially movable along axis 24 between an open position and a sealed position as a result of forces acting on stationary seal ring 60. These forces are the result of pressures in the low and high pressure areas 54 and 56 acting on the various surfaces of stationary seal ring 60. During low or no power conditions, aspirating face seal assembly 52 is in the open position (shown in FIG. 3) such that stationary seal ring 60 and stationary seal surface 72 are biased away from rotating seal ring 58 and rotating seal surface 68 by biasing component 80. In the open position, engine 10 is operating at low or no pressure loading and/or the pressures in high pressure area 56 and low pressure area 54 are substantially equal. Biasing component 80 urges stationary seal ring 60 away from rotating seal ring 58 such that axial gap 74 defines a width $W_1$. Also in the open position, seal tooth 98 of auxiliary seal 86 is positioned radially outward from oblique portion 94 and substantially midway between rotating seal surface 68 and upstream surface 92 such that gap 102 defines a width $W_2$ that is smaller than $W_1$.

In the exemplary embodiment, once engine 10 has started and before it reaches base operating load, aspirating face seal assembly 52 is in an intermediate position (shown in FIG. 4). As engine 10 is started, seal tooth 98 restricts the flow of high pressure leakage air from high pressure area 56 through leakage path 64 and into low pressure area 54 thereby causing a pressure differential between areas 54 and 56. The pressure differential between low and high pressure areas 54 and 56 acts as a closing pressure force on stationary seal ring 60 and overcomes the biasing force caused by biasing component 80 to urge stationary seal ring 60 towards rotating seal ring. In such an intermediate position, the pressure differential biases stationary seal ring 60 towards rotating seal ring 58 such that axial gap 74 defines a width $W_3$ that is less than width $W_1$. Further, as stationary seal ring 60 moves toward rotating seal ring 58, seal tooth 100 moves axially along oblique portion 94 toward upstream surface 92 such that gap 102 defines a width $W_4$ that is larger than width $W_2$. In the intermediate position, gap 74 is narrower and gap 102 is wider than in the open position. The obliquely sloped shape of radially outer surface 90 enables gap 102 to widen as stationary seal ring 60 moves axially towards rotating seal ring 58. The widening of gap 102 and narrowing of gap 74 act to reduce the pressure differential between low pressure area 54 and high pressure area 56 such that the speed at which stationary seal ring 60 advances towards rotating seal ring 58 is slowed.

During higher power operation, such as when engine 10 is operating at base load, aspirating face seal assembly 52 is in the sealed position (shown in FIG. 5) to further restrict the flow of air from high pressure area 56 to low pressure area 54, therefore substantially sealing leakage flow path 64 and increasing the efficiency of engine 10. The pressure in high pressure area 56 rises as the pressure loading of engine 10 also increases, thus causing stationary seal ring 60 to advance further along axis 24 toward rotating seal ring 58, which causes axial gap 74 to narrow further to define a width $W_5$ that is narrower than width $W_3$. As described above, at least one of surfaces 68 and/or 72 include grooves 70 that trap a portion of the air in leakage path 64 and generate a hydrodynamic force that at least partially counteracts the biasing forces created by the relatively high pressure acting on stationary seal ring 60. However, these hydrodynamic forces may not be sufficient to completely balance the forces caused by the high pressure air and may result in contact between stationary seal ring 60 and rotating seal ring 58.

In the exemplary embodiment, auxiliary seal 86 is configured to gradually reduce the pressure drop between low pressure are 54 and high pressure area 56 such that the pressure forces acting on stationary seal ring 60 are gradually reduced, thus slowing the speed at with stationary seal ring 60 approaches rotating seal ring 58 and thus maintaining an operation clearance of gap 74. As engine 10 reached base load and aspirating seal assembly 52 approaches the sealed position, seal tooth 98 continues moving axially along oblique portion 94 of radially outer surface 90 toward upstream surface 92 such that gap 102 defines a width $W_6$ that is larger than width $W_4$. In the sealed position, gap 74 is wider and gap 102 is narrower than in the intermediate position. Furthermore, width $W_5$ of gap 74 is narrower than width $W_6$ of gap 102 in the sealed position. The widening of gap 102 as oblique portion 94 slopes away from tooth tip 100 and narrowing of gap 74 as stationary seal ring 60 approaches rotating seal ring 58 acts to further reduce the pressure differential between low pressure area 54 and high pressure area 56 such that the speed at which stationary seal ring 60 advances towards rotating seal ring 58 is slowed and the hydrodynamic forces generated by grooves 70 are sufficient to maintain an operational clearance of width $W_5$ and to prevent impact of stationary seal ring 60 and rotating seal ring 58.

As described herein aspirating face seal assembly 52 includes an auxiliary seal 86 that avoids significant amounts of heating and scratching of opposing sealing surfaces 68 and 72 that occur when stationary seal ring 60 contacts rotating seal ring 58, thus reducing heat input into the rotating components and maintaining a smooth surface finish of sealing surfaces 68 and 72. This reduces the possibility of material degradation and premature component failure. Furthermore, a coating may be applied to oblique portion 94 and/or to tooth tip 100 to further minimize heat transfer to rotating seal ring 58.

The assembly and methods as described herein facilitate improving rotary machine performance by reducing a pressure drop between high and low pressure areas that substantially slows the axial movement of the stationary component to prevent impact with the rotating component. Specifically, the aspirating face seal described herein includes an auxiliary seal that includes a stationary (non-rotating) seal tooth positioned radially outward from an obliquely-oriented surface of the rotating component such that a radial gap is defined therebetween. As the seal tooth moves axially along the oblique surface, the gap becomes wider the pressure differential between a high pressure area and a low pressure area is facilitated to be reduced. Therefore, in contrast to known aspirating seals without such an auxiliary seal, the methods and assemblies described herein facilitate slowing the movement of the stationary component to prevent impact with the rotating component, thus increasing the efficiency and the operating lifetime of the steam turbine engine and its components.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

While the invention has been described in terms of various specific embodiments, those skilled in the art will recognize that the invention can be practiced with modification within the spirit and scope of the claims.

What is claimed is:

1. An aspirating face seal for use with a rotary machine that includes a centerline axis, said aspirating face seal comprising:
    a rotating seal ring comprising a sealing surface, an opposite upstream surface, and a radially outer surface that extends between said sealing surface and said upstream surface, wherein said sealing surface has a radius that is larger than a radius of said upstream surface, said radially outer surface includes an oblique portion that slopes radially inward from a first end proximate said sealing surface towards a second end proximate said upstream surface;
    a stationary seal ring having a sealing surface and coupled proximate said rotating seal ring such that a first gap is defined axially between said stationary seal ring sealing surface and said rotating seal ring sealing surface, said stationary seal ring including an extension member extending across said first gap; and
    an auxiliary seal comprising at least one seal tooth that includes a seal tooth tip, said at least one seal tooth extending radially inward from said extension member such that a second gap is defined radially between said seal tooth tip and said oblique portion, wherein said stationary seal is axially movable along said centerline axis between a first position, wherein said first gap defines a first width and said second gap defines a second width, and a second position, wherein said first gap defines a third width that is narrower than the first width and said second gap defines a fourth width that is wider than the second width.

2. The aspirating face seal in accordance with claim 1, wherein said auxiliary seal is configured to restrict a flow of process fluid through said first gap such that a pressure differential between an area of high pressure upstream of said first gap and an area of low pressure downstream of said first gap causes axial movement of said stationary seal ring from the first position to the second position.

3. The aspirating face seal in accordance with claim 2, wherein said auxiliary seal is configured to reduce the pressure differential to facilitate reducing a speed at which said stationary seal ring approaches said rotating seal ring during transition from the first position to the second position.

4. The aspirating face seal in accordance with claim 1, wherein said oblique portion is substantially arcuate.

5. The aspirating face seal in accordance with claim 1, wherein the second width is narrower than the first width, and the fourth width is wider than the third width.

6. The aspirating face seal in accordance with claim 1 further comprising a seal housing and a biasing component that extends between said seal housing and said stationary seal ring, said biasing component configured to bias said stationary seal ring away from said rotating seal ring in the first position.

7. The aspirating face seal in accordance with claim 1, wherein in the first position, said rotary machine is in one of a no pressure and a low pressure operating condition, and in the second position, said rotary machine is in a relatively higher pressure operating condition.

8. The aspirating face seal of claim 1, wherein said seal tooth tip is positioned over a central portion of said oblique portion in the first position, and said seal tooth tip is positioned proximate said second end of said oblique portion in the second position.

9. A rotary machine comprising:
    a casing;
    a rotatable shaft defining a centerline axis; and
    a sealing system comprising:
        a rotating seal ring coupled to said shaft, said rotating seal ring comprising a sealing surface, an opposite upstream surface, and a radially outer surface that extends between said sealing surface and said upstream surface, wherein said sealing surface has a radius that is larger than a radius of said upstream surface, said radially outer surface includes an oblique portion that slopes radially inward from a first end proximate said sealing surface towards a second end proximate said upstream surface
        a stationary seal ring having a sealing surface and coupled to said casing proximate said rotating seal ring such that a first gap is defined axially between said stationary seal ring sealing surface and said rotating seal ring sealing surface, said stationary seal ring including an extension member extending across said first gap; and
        an auxiliary seal comprising at least one seal tooth that includes a seal tooth tip, said at least one seal tooth extending radially inward from said extension member such that a second gap is defined radially between said seal tooth tip and said oblique portion, wherein said stationary seal is axially movable along said centerline axis between a first position, wherein said first gap defines a first width and said second gap defines a second width, and a second position, wherein said first gap defines a third width that is narrower than the first width and said second gap defines a fourth width that is wider than the second width.

10. The rotary machine in accordance with claim 9, wherein said auxiliary seal is configured to restrict a flow of process fluid through said first gap such that a pressure differential between an area of high pressure upstream of said first gap and an area of low pressure downstream of said first gap causes axial movement of said stationary seal ring from the first position to the second position.

11. The rotary machine in accordance with claim 10, wherein said auxiliary seal is configured to reduce the pressure differential to facilitate reducing a speed at which said stationary seal ring approaches said rotating seal ring during transition from the first position to the second position.

12. The rotary machine in accordance with claim 9, wherein said oblique portion is substantially conical.

13. The rotary machine in accordance with claim 9, wherein the second width is narrower than the first width, and the fourth width is wider than the third width.

14. The rotary machine in accordance with claim 9, wherein during transition from the first position to the second position, said at least one seal tooth moves axially along said oblique portion.

15. The rotary machine in accordance with claim 9, wherein said oblique portion slopes radially inward toward said centerline axis.

16. The rotary machine in accordance with claim 9, wherein in the first position, said rotary machine is in one of a no pressure or a low pressure operating condition, and in the second position, said rotary machine is in a relatively higher pressure operating condition.

17. A method of assembling a sealing system for use in a rotary machine, said method comprising:

coupling a rotating seal ring to a rotatable shaft that defines a centerline axis, wherein the rotating seal ring includes a sealing surface, an opposite upstream surface, and a radially outer surface that extends between the sealing surface and the upstream surface, wherein the sealing surface has a radius that is larger than a radius of the upstream surface, and the radially outer surface includes an oblique portion that slopes radially inward from a first end proximate the sealing surface towards a second end proximate the upstream surface;

coupling a stationary seal ring having a sealing surface proximate the rotating seal ring such that a first gap is defined axially between said stationary seal ring sealing surface and said rotating seal ring sealing surface, wherein the stationary seal ring includes an extension member extending across the first gap; and forming an auxiliary seal radially outward from the rotating seal ring, wherein the auxiliary seal includes at least one seal tooth that includes a seal tooth tip, and wherein the at least one seal tooth extends radially inward from the extension member such that a second gap is defined radially between the seal tooth tip and the oblique portion, wherein the stationary seal is axially movable along the centerline axis between a first position, wherein the first gap defines a first width and the second gap defines a second width, and a second position, wherein the first gap defines a third width that is narrower than the first width and the second gap defines a fourth width that is wider than the second width.

18. The method in accordance with claim 17, wherein forming an auxiliary seal further comprises restricting a flow of process fluid through the first gap such that a pressure differential between an area of high pressure upstream of the first gap and an area of low pressure downstream of the first gap causes axial movement of the stationary seal ring from the first position to the second position.

19. The method in accordance with claim 17, wherein forming an auxiliary seal further comprises reducing the pressure differential to facilitate reducing a speed at which said stationary seal ring approaches said rotating seal ring during transition from the first position to the second position.

20. The method in accordance with claim 17, wherein coupling a stationary seal ring proximate the rotating seal ring further comprises coupling the stationary seal ring proximate the rotating seal ring such that the second width is narrower than the first width, and such that the fourth width is wider than the third width.

* * * * *